United States Patent [19]
Masciarelli, Jr.

[11] Patent Number: 6,019,211
[45] Date of Patent: Feb. 1, 2000

[54] CONVEYOR AND WORKSTATION

[75] Inventor: Camillo Masciarelli, Jr., Marlboro, Mass.

[73] Assignee: Omtec Corporation, Marlborough, Mass.

[21] Appl. No.: 08/785,368

[22] Filed: Jan. 17, 1997

Related U.S. Application Data

[60] Provisional application No. 60/010,163, Jan. 18, 1996.

[51] Int. Cl.$^7$ .................................................. B65G 15/64
[52] U.S. Cl. .................................. 198/345.1; 198/345.3; 198/346.1; 198/346.2; 198/457.02; 198/782; 193/35 MD
[58] Field of Search .................................. 193/35 A, 42, 193/45, 36, 35 MD; 198/345.1, 345.3, 346.1, 346.2, 368, 457.02, 457.07, 688.1, 782, 463.4, 463.6, 459.7

[56] References Cited

U.S. PATENT DOCUMENTS

| | | | |
|---|---|---|---|
| 1,251,881 | 1/1918 | Goodwin | 193/35 MD |
| 2,506,425 | 5/1950 | Journeaux | 198/345.1 |
| 2,590,994 | 4/1952 | McKay . | |
| 2,789,708 | 4/1957 | Payne . | |
| 2,822,073 | 2/1958 | Payne | 193/36 |
| 2,875,907 | 3/1959 | Locke et al. | 414/789.9 |
| 3,173,554 | 3/1965 | Ebbert | 198/370.09 |
| 3,251,554 | 5/1966 | Conway et al. | 198/460.1 |
| 3,476,265 | 11/1969 | Powers | 198/614 |
| 4,182,245 | 1/1980 | Stewart et al. | 110/101 |
| 4,365,699 | 12/1982 | Dussud . | |
| 4,627,526 | 12/1986 | Masciarelli | 193/35 A |
| 4,706,793 | 11/1987 | Masciarelli | 193/35 A |
| 4,732,490 | 3/1988 | Masciarelli | 384/49 |
| 5,409,096 | 4/1995 | Clopton | 198/460 |
| 5,413,204 | 5/1995 | Mori et al. | 198/345.1 |

FOREIGN PATENT DOCUMENTS

| | | | |
|---|---|---|---|
| 2152430 | 12/1977 | Germany | 198/313 |
| 1401459 | 7/1975 | United Kingdom | 198/345.1 |
| 1441125 | 6/1976 | United Kingdom | 198/313 |

*Primary Examiner*—Robert P. Olszewski
*Assistant Examiner*—Steven B. McAllister
*Attorney, Agent, or Firm*—Peter F. Corless; Christine C. O'Day; Dike, Bronstein, Roberts & Cushman, LLP

[57] ABSTRACT

A conveyor having a plurality of spaced rollers mounted between a pair of elongated horizontal frame members for supporting an article and enabling the article to be conveyed longitudinally of the frame members. The conveyor has a workstation formed by a plurality of interrupter strips extending in the spaces between rollers. Each interrupter strip has a plurality of lifting pads which are selectively movable between a lower position in which the upper surface of the pads are below the tops of the rollers and an upper position in which the upper surface of the pads are above the tops of the rollers for supporting the article and frictionally engaging the article to maintain the article in a stable position above the strips. The interrupter strips also have a plurality of balls mounted for omnidirectional rotation on the interrupter strip. Each ball is selectively moveable between a lower position in which the top of the ball is below the top of the rollers and an upper position in which the top of the ball is above the top of the rollers. The balls are selectively moved independently of the lifting pads so that the article can be supported solely by the balls or by the lifting pads.

7 Claims, 6 Drawing Sheets

CONVEYOR AND WORKSTATION

CROSS-REFERENCE TO RELATED APPLICATIONS

This application is a continuing application of Provisional Application No. 60/010,163, filed Jan. 18, 1996 (pending).

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is generally directed to a conveyor for articles, wherein the conveyor includes a workstation for performing a task on the article or for transferring the article to a second lateral conveyor. The invention is particularly directed to a roller conveyor in which a section of the conveyor can selectively function as a workstation at which the longitudinal conveyance of the article is temporarily halted. The article may be halted for lateral transfer to another conveyor, for performing a task on the article, or for reorienting the article on the conveyor.

A roller conveyer system is shown in my issued U.S. Pat. No. 4,706,793 which has a transfer station for enabling an article to be selectively transferred to a lateral conveyor. The article can also be reoriented on the transfer station. The transfer station comprises a plurality of interrupter strips interposed between rollers. Each interrupter strip has a plurality of balls which are selectively movable between a lower neutral position below the tops of the rollers to an upper active position wherein the tops of the balls are above the tops of the rollers. However, the transfer station does not enable the article to be maintained in a stationary manner for enabling a task to be performed on the article.

It is, therefore, a primary object of the invention to provide a roller conveyor having a workstation, wherein an article can be selectively and temporarily halted and maintained in a stationary position to enable a task to be performed on the article.

A further object of the invention is the provision of a roller conveyor having a workstation wherein an article can be halted and selectively maintained in a stationary position and reoriented or transferred to a lateral conveyor.

A further object of the invention is the provision of a tray having a surface which can selectively support an article in a fixed position or enable the article to be easily reoriented on the surface or transferred to another surface.

With these and other objects in view, as will be apparent to those skilled in the art, the invention resides in the combination of parts set forth in the specification and covered by the claims appended hereto.

BRIEF SUMMARY OF THE INVENTION

The invention consists of a conveyor having a plurality of spaced rollers mounted between a pair of elongated horizontal frame members for supporting an article and enabling the article to be conveyed longitudinally of the frame members. The conveyor has a workstation formed by a plurality of interrupter strips located between the rollers. Each interrupter strip has a plurality of lifting pads which are movable between a lower position in which the upper surface of the pads are below the tops of the rollers and an upper position in which the upper surface of the pads are above the tops of the rollers for supporting the article and frictionally engaging the article to maintain the article in a stable position above the strips. More specifically, the interrupter strips have a plurality of balls mounted for omnidirectional rotation on the interrupter strip. Each ball is selectively moveable between a lower position in which the top of the ball is below the top of the rollers and an upper position in which the top of the ball is above the top of the rollers. Actuating means are provided for selectively moving the balls independently of the lifting pads so that the article can be supported solely by the balls or by the lifting pads.

BRIEF DESCRIPTION OF THE DRAWINGS

The character of the invention, however, may be best understood by reference to one of the structural forms, as illustrated by the accompanying drawings, in which.

DETAILED DESCRIPTION OF THE INVENTION

Figure 1:
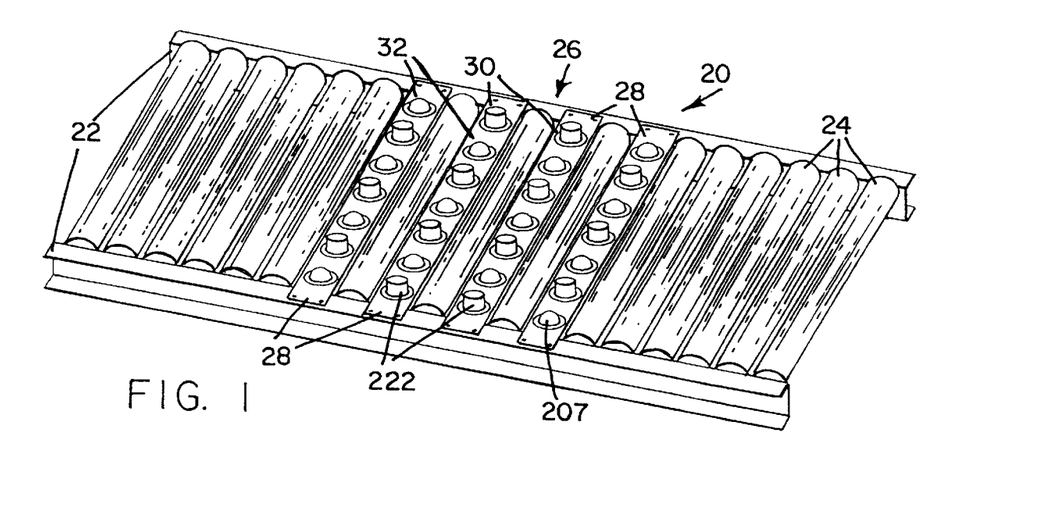
FIG. 1 is an isometric view of the roller conveyor at a workstation and embodying the principles of the present invention.

Referring first to FIG. 1, the roller conveyor of the present invention is generally indicated by the reference numeral 20 and comprises a pair of spaced horizontal elongated frame members 22 which support a plurality of spaced horizontal rollers 24 extended between the frame members 22. The rollers are mounted on the frame members 22 for axial rotation and for enabling an article to be conveyed transversely of the rotational axis of the rollers 24 and longitudinally of the frame members 22. Only a small section of the conveyor 20 is shown in FIG. 1. The conveyor 20 also includes a workstation, generally indicated by the reference numeral 26. In the workstation 26, every other roller 24 is removed and replaced by interrupter strips 28 which are fastened to the frame members 22. Each interrupter strip 28 includes a plurality of lifting pad units, generally indicated by the reference numeral 30 and a plurality of ball units, generally indicated by the reference numeral 32. The lifting units 30 and the ball units 32 are shown in detail in FIGS. 6–9.

Figure 6:
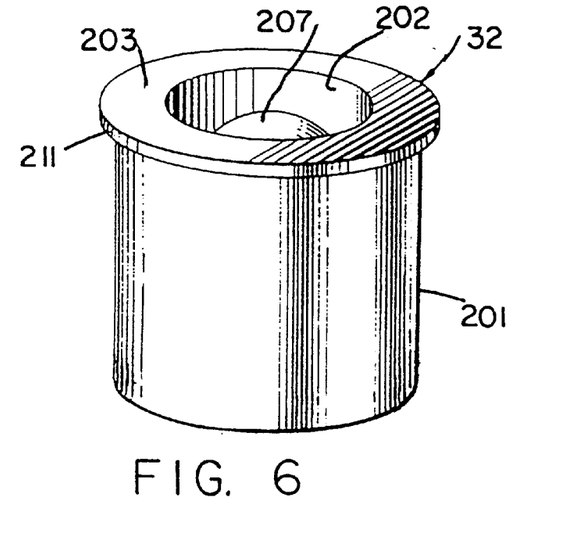
FIG. 6 is an isometric view of a ball unit.
Figure 7:
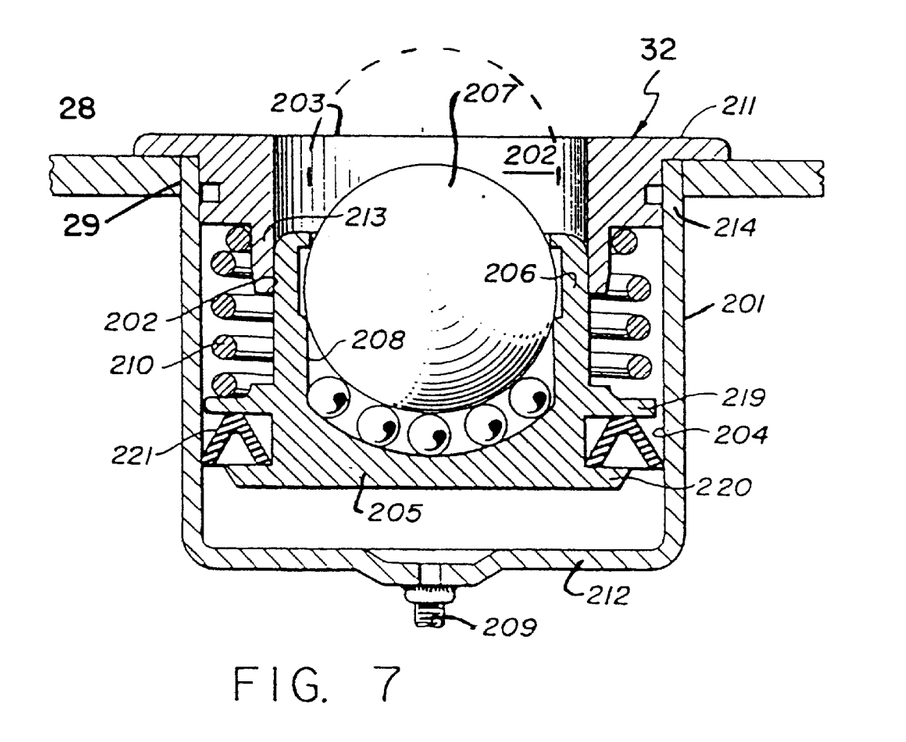
FIG. 7 is a vertical cross-sectional view of the ball unit of FIG. 6.

Referring to FIGS. 6 and 7, the ball unit 32 consists of a main body 201, having a tubular portion 213 with a small first bore 202 entering from a top surface 203. The main body consists of a tubular portion 214 with a second bore 204 extending through it. This tubular portion is closed at one end by the top wall 211 and closed at the other end by a bottom wall 212. The top wall has the first bore 202 extending through it and opening on its outer surface 203. The top wall has the integral tubular portion 213 extending from its inner surface having a bore which is an extension of the small bore 202. A piston 205 is slidable in the large bore 204 and has a cylindrical stem 206 which is slidable in the small bore 202. A primary ball 207 is rotatably mounted in the stem 206 concentrically of the small bore and resides in a cavity 208 formed in the stem. A coil spring 210 extends between the top wall 211 and a facing surface of the piston 205. A connector 209 is provided for introducing pressurized air into the main body between the bottom wall 212 and the piston 205 to move the piston, so that the ball 207 protrudes out of the small bore and above the surface 203 to the dotted line position shown in FIG. 7.

The piston 205 and the stem 206 are integral. The piston has two spaced radial flanges 219 and 220 between which lies a U-type seal 221 whose flexible element engages the surface of the second bore 204.

The ball unit 32 along with modified ball units are disclosed in greater detail in my issued U.S. Pat. No. 4,660,994. Modified ball unit strips for application to a roller conveyor are disclosed in my issued U.S. Pat. No. 4,706,793. Each of my issued U.S. Pat. Nos. 4,660,994 and 4,706,793 are hereby incorporated by reference in the present application.

Figure 8:
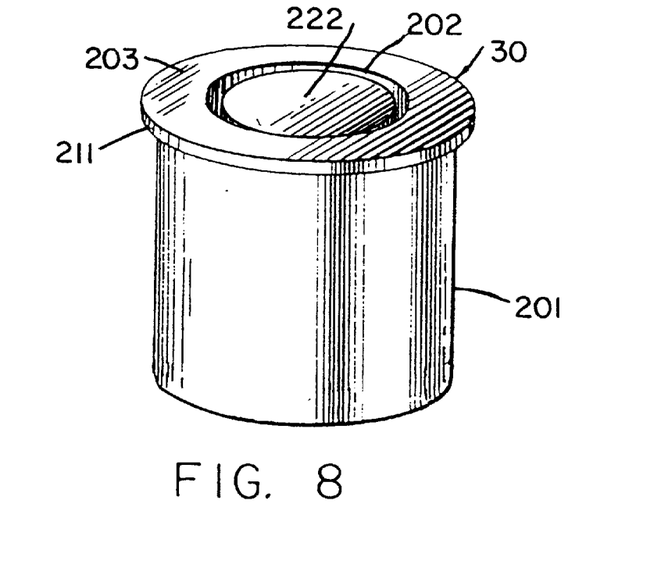
FIG. 8 is an isometric view of a lifting pad unit.
Figure 9:
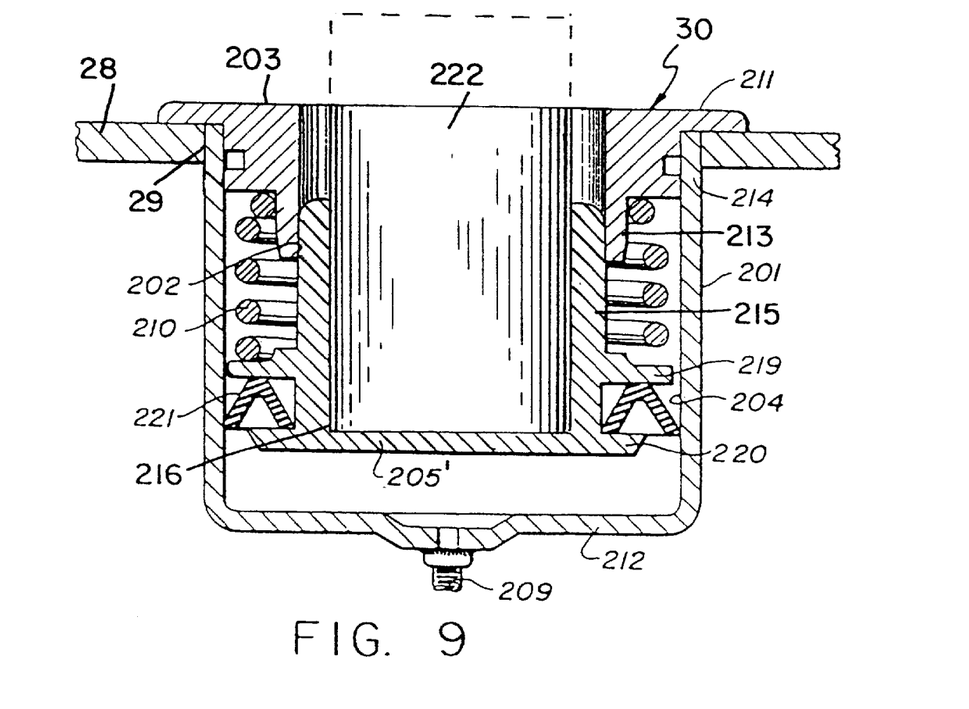
FIG. 9 is a vertical cross-sectional view of the lifting pad unit of FIG. 8.

Referring to FIGS. 8 and 9, the lifting pad unit 30 is identical to the ball unit 32, except that the piston portion of the unit contains a cylindrical pad instead of a ball. The piston portion of the lifting pad unit 30, identified by the reference numeral 205', includes a cylindrical tubular portion 215 which contains a cylindrical cavity 216 and a cylindrical pad 222 is located within the cavity 216. All of the portions on the piston 205'which are identical to the piston 205 are identified with the same reference numerals as piston 205. When air at superatmospheric pressure is introduced into the main body between the bottom wall 212 and the piston 205' through the connector 209, the cylindrical tubular portion 215 is moved upwardly from the lower or neutral position shown in solid lines in FIG. 9, to the upper or active article supporting position, shown in dotted lines in FIG. 9.

Referring to FIGS. 1, 7 and 9, the ball units 32 and the lifting pad units 30 are mounted in apertures 29 in the interrupter strips 28. The ball units 32 and the lifting pad units 30 are located alternately on each strip 28. The ball units 32 and the lifting pad units 30 may be deployed in the strips 28 in any order. If desired, a strip 28 may contain all ball units 32 while the adjacent strip 28 may contain all lifting pad units 30. As used herein, "transfer strip" shall refer to an interrupter strip containing only ball units.

Figure 5:
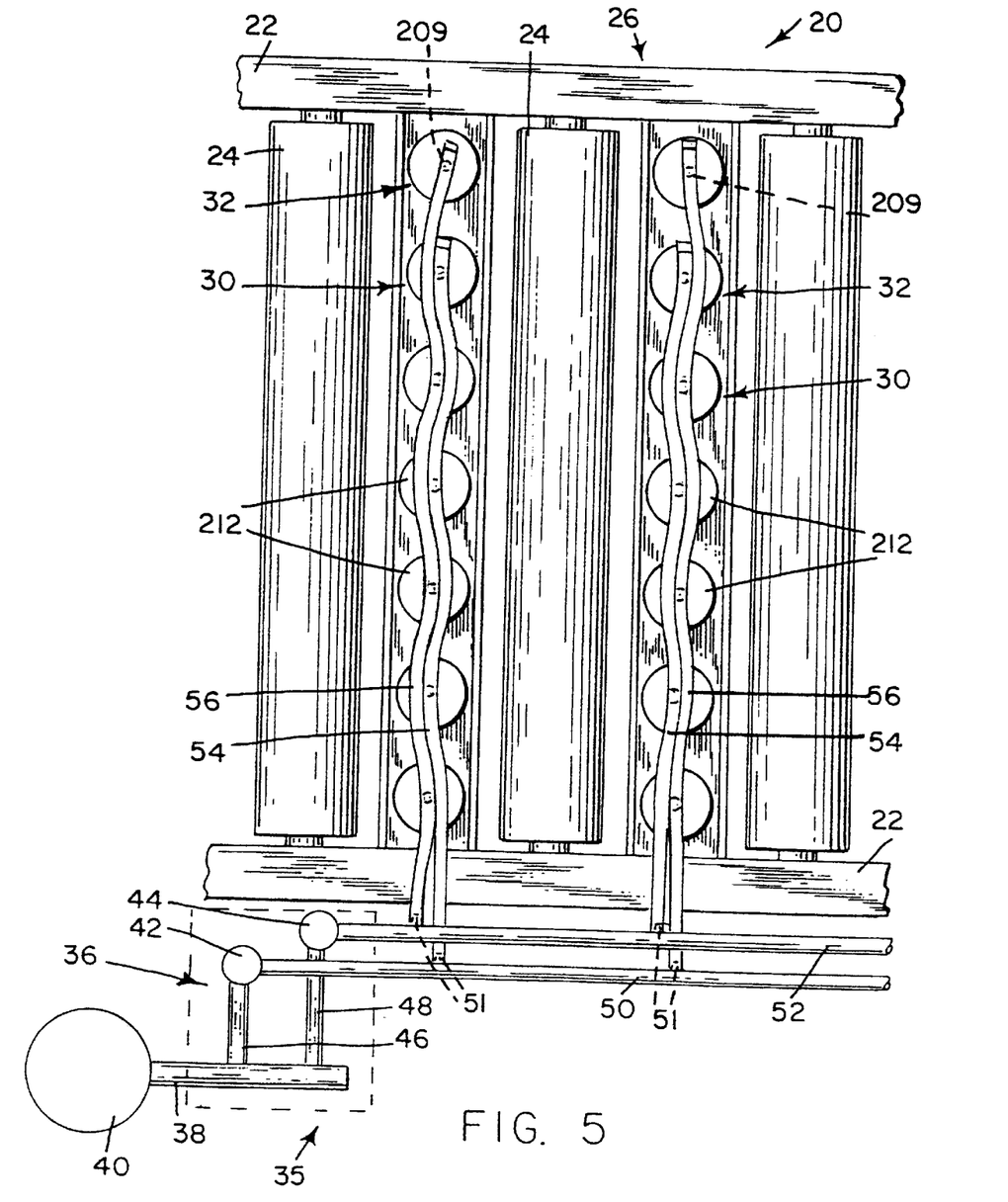
FIG. 5 is a fragmentary bottom plan view of the roller conveyor showing the pneumatic actuating means for selectively controlling the relative positions of the balls and lifting pads at the workstation of the conveyor.

Referring to FIG. 5, the means for selectively activating the ball units 32 and the lifting pad units 30 is generally indicated by the reference numeral 35 and includes a control assembly, generally indicated by the reference numeral 36. The control assembly 36 includes a pair of solenoid valves 42 and 44 which are operatively connected to a manifold pipe 38 through pneumatic lines 46 and 48, respectively. The manifold pipe 38 is connected to a source 40 of air at superatmospheric pressure. The valve 42 is operatively connected to a feeder line 50. The valve 44 is operatively connected to a feeder line 52. The feeder line 50 has a plurality of air fixtures 51 for connecting the feeder line 50 to a plurality of flexible air hoses 54. The feeder line 52 has a plurality of fixtures 51 for connecting the feeder line 52 to a plurality of flexible air hoses 56. The air hoses 54 extend beneath the strips 28 and are connected to the connectors 209 of each of the lifting pad units 30. The air hoses 56 are also beneath the strips 28 and are connected to the connectors 209 of the ball units 32. The valves 42 and 44 are normally in a closed condition and are selectively actuated to an open condition by an electrical control unit, not shown, which is operated by a conveyor attendant. Manually actuated valves can also be used to control the pressurized airflow from the source 40 to the feeder lines 50 and 52.

Figure 2:
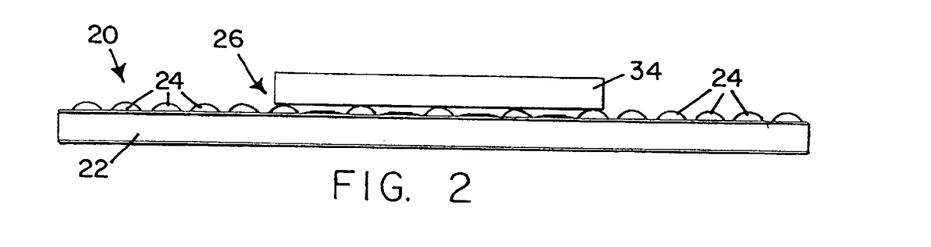
FIG. 2 is a side elevational view of the roller conveyor in its conveying mode.
Figure 3:
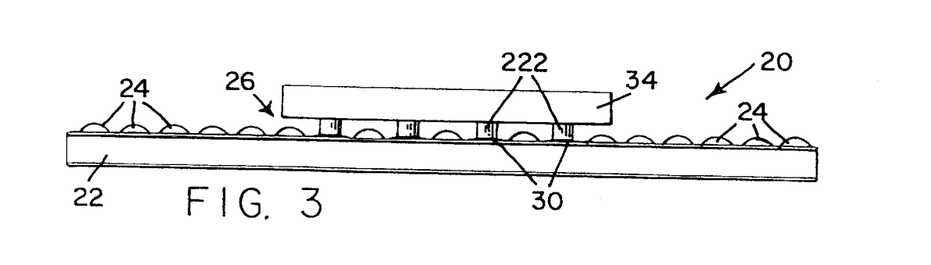
FIG. 3 is a side elevational view of the roller conveyor in its article retention mode.

Referring to FIGS. 1–5, the roller conveyor 20 of the present invention is utilized by conveying an article 34 along the rollers 24 to the workstation 26 as shown in FIG. 2. If no work is to be performed on the article 34 at the workstation 26 or if the article 34 is not to be transferred to another conveyor, the valves 42 and 44 are not energized and remain closed. This means that lifting pad units 30 and ball units 32 remain in their normal neutral states so that the balls 207 and the pads 222 are located below the conveyance plane of the article or below the tops of the rollers 24. The article 34, therefore, can be conveyed through the workstation 26 to a point downstream of the conveyor. If it is desired to stop the article 34 at the workstation 26 for enabling work to be performed on the article, the valve 42 is opened to operatively connect the airline 54 to the source 40 of air at superatmospheric pressure. The lifting pad units 30 are actuated to lift the pads 222 to their upper positions, as shown in FIG. 3, to support the article 34 and to maintain the article in a stable position. The pads can be made of any material which has a relatively high coefficient of friction. It is preferred that the pads 22 be made of an elastomeric material such as natural or synthetic rubber so that the upper surfaces of the pads 222 have a high coefficient of friction to maintain the article 34 in a stable position at the workstation 26. For situations where the articles being conveyed are relatively heavy, the pads are made of a relatively rigid material such as metal. For situations where the article being conveyed have electronic components, the pads are made of an electrically conductive material for discharge of static charges. An elastomeric material such as polyurathane impregnated with an electrically conductive material such as carbon powder or carbon fibers has been found to be ideal for the conveyance of the widest range of articles.

Figure 4:
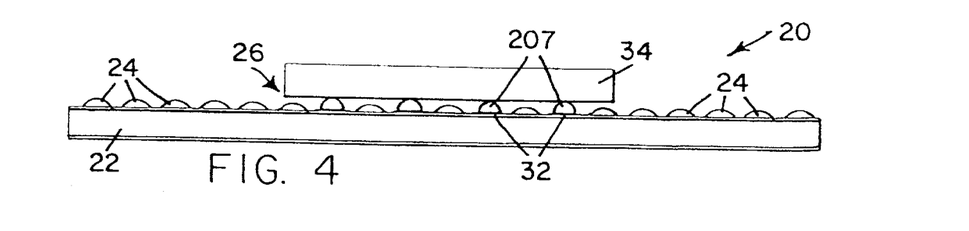
FIG. 4 is a side elevational view of the roller conveyor in its article transfer/reorientation mode.

If it is desired to stop the article 34 at the workstation 26 for the purpose of reorienting the article relative to the conveyor or for transferring the article to another conveyor that extends transversely of the conveyor 20, valve 44 is energized to the open position for connecting the flexible air hoses 56 to the source 40 of air at superatmospheric pressure. This causes the ball units 32 to be actuated from their neutral position to their active position, wherein the balls 207 are raised. The upper ends of the raised balls 207 are above the conveyance plane of the article 34 or above the tops of the rollers 24, as shown in FIG. 4. The article 34 is fully supported on the balls 207 so that the article 34 can be rotated horizontally relative to the conveyor or to be transferred laterally to another conveyor. Once that the article 34 is reoriented on the balls 207 at the workstation 26, a task can be performed on the article 34 at its new orientation relative to the conveyor by actuating the valve 42 which, in turn, causes the lifting pad units 30 to be activated. This causes the pads 222 to be raised to their upper positions so that the article 34 is supported solely on the pads 222. The upper surfaces of the raised pads 222 are higher than the tops of the balls 207 so that the article 34 is supported solely on the pads, even if the balls 207 are in their upper position. After a task has been performed on the article 34, valve 42 is closed. This causes the lifting pad units 30 to be deactivated, thereby lowering the pads 222. When the pads 222 are lowered, the article 34 comes to rest on the balls 207. This enables the article 34 to be reoriented on the workstation 26 to a new position or back to its original position or to be transferred laterally of the conveyor 20 to a second conveyor. If the article 34 is to be conveyed along the conveyor 20 to a downstream position on the conveyor, valve 44 is closed to deactivate the ball units 32 and lower the balls 27. However, it is also possible to move the article 34 longitudinally of the conveyor 20 even if the balls 207 are in their raised or upper position.

Figure 10:
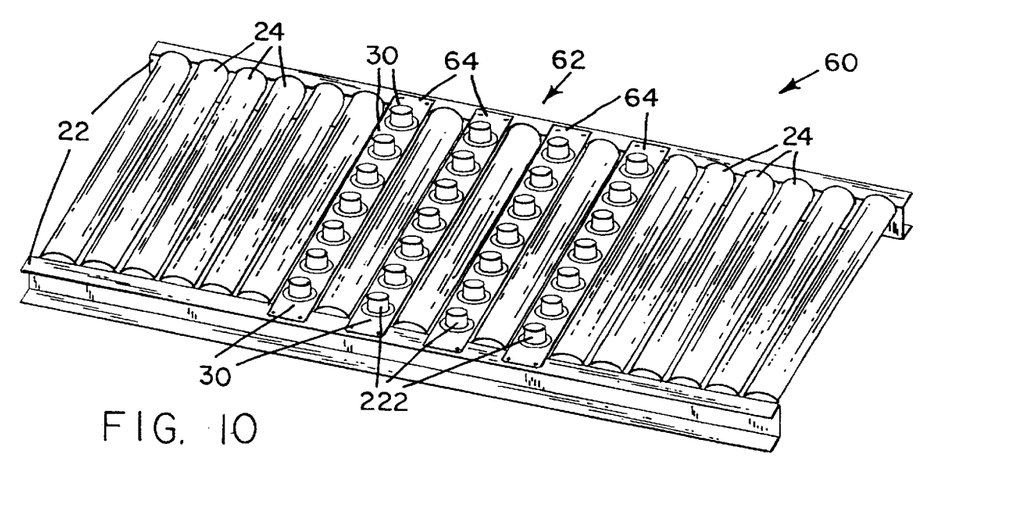
FIG. 10 is an isometric view of a roller conveyor having a workstation made up solely of lifting pads.
Figure 11:
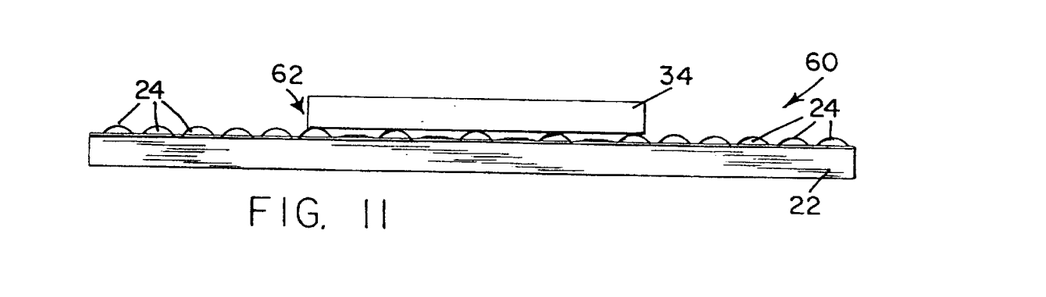
FIG. 11 is a side elevational view of the roller conveyor of FIG. 10, showing the conveyor in the article conveying mode.
Figure 12:
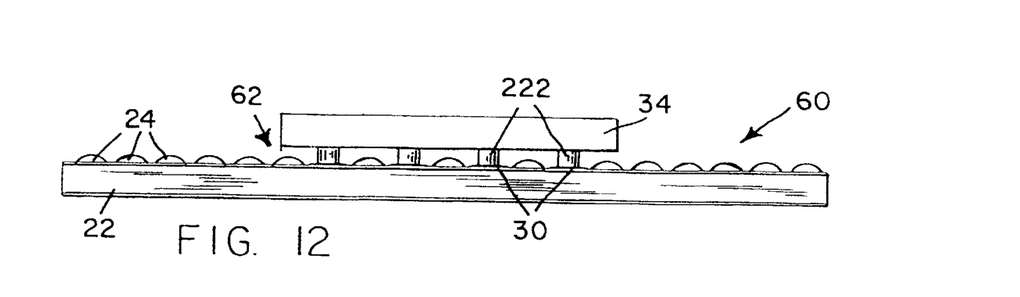
FIG. 12 is a side elevational view of the roller conveyor of FIG. 10, showing the roller conveyor in the article lifting and retaining mode.

Referring FIG. 10, there is shown a modified roller conveyor embodying the principles of the present invention which is generally indicated by the reference numeral 60. The conveyor 60 is identical to the conveyor 20, in that, it includes spaced elongated frame members 22 and rollers 24. The conveyor 60 has a modified workstation, generally indicated by the reference numeral 62 which has interrupter strips 64 fixed to the frame members 22. The strips 64 are identical to the strips 28 of the preferred embodiment except that they contain only lifting pad units 30. The means for actuating the lifting pad units 30 and the strips 64 are similar to the actuating means 35, shown in FIG. 5, except that only one solenoid valve is required for activating the lifting pad units 30. When the article 34 is to be conveyed along the conveyor 60 past the workstation 62, the valve which controls the lifting pad units 30 is closed so that the lifting pad units 30 return to their neutral or nonactive state and the pads 22 are in their lower positions, as shown in FIG. I1. If it is desired to stop the article 34 at the workstation 62, the solenoid valve which controls the lifting pad units 30 is opened, thereby activating the lifting pads 222 to be raised to their upper positions, as shown in FIG. 12. The activation of the lifting pad units 30 causes the article 34 to be fully supported on the lifting pads 222 for enabling a task to be performed on the article. After a task has been completed on the article 34, the lifting pad units 30 are deactivated by closing the solenoid valve which controls the lifting pad units. The lifting pads 222 are then returned to their lower positions. This causes the article 34 to again come to rest on the rollers 24, as shown in FIG. 11. The article 34 can then be conveyed along the conveyor 60 to a downstream position.

Figure 13:
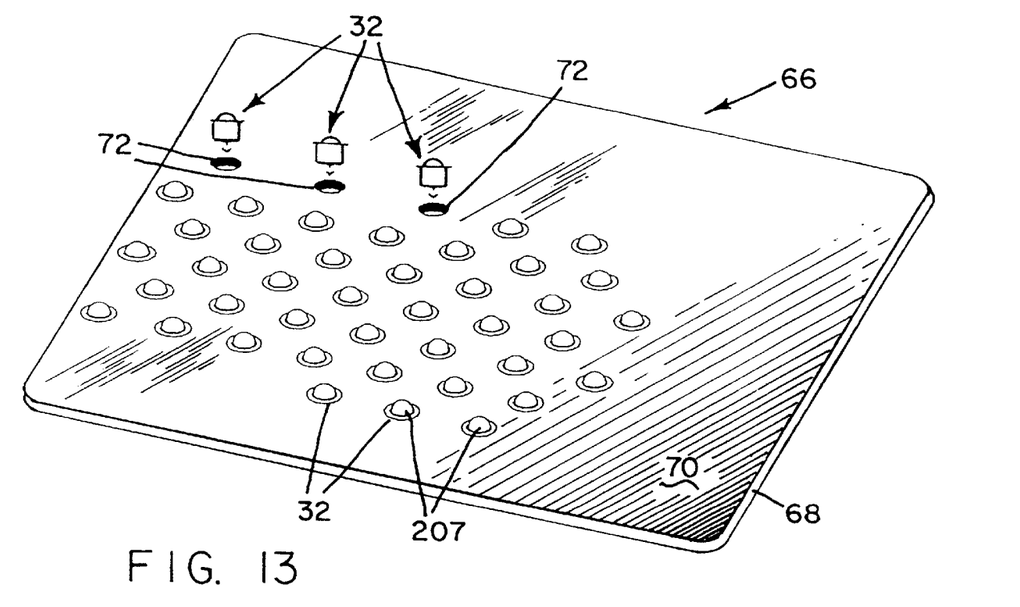
FIG. 13 is an isometric view of an article supporting tray which is provided with ball units for enabling the article to be selectively reoriented or transferred from the tray.
Figure 14:
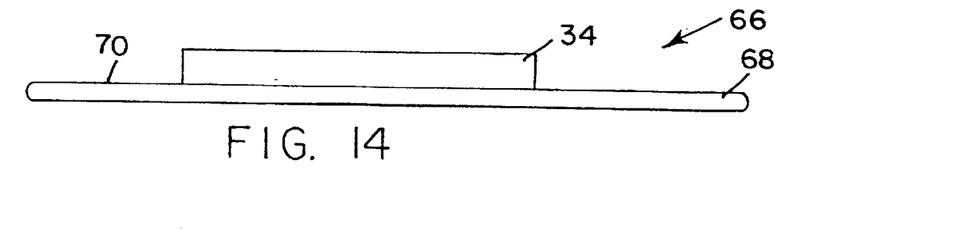
FIG. 14 is a side elevational view of the tray in the article retention mode.
Figure 15:
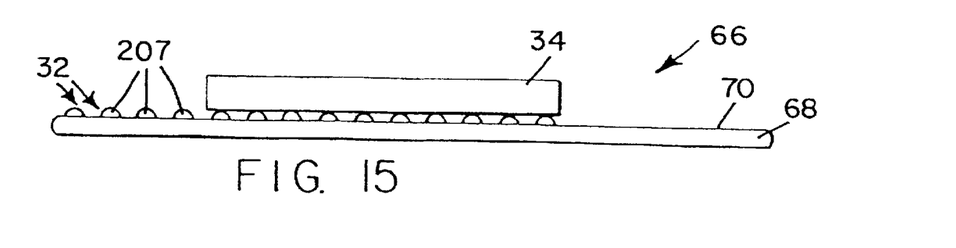
FIG. 15 is a side elevational view of the tray of FIG. 13 showing the tray in the article reorientation/transfer mode.

Referring to FIG. 13, there is shown a still further modification which consists of a tray, generally indicated by the reference numeral 66. The tray 66 includes an upper wall 68 which has an upper horizontal surface 70 and a plurality of apertures 72 for receiving the ball units 32 described above. The ball units 32 are controlled by actuating means similar to actuating means 35 except that a single solenoid valve is employed for controlling air hoses operatively connected to the ball units 32. When the ball units 32 are in their neutral or non-activated state, the balls 207 are located below the surface 70 so that an article 34 is fully supported on the surface 70, as shown in FIG. 14. When the solenoid valve which controls the ball units 32 is opened, the ball units 32 are connected to the source of air at superatmospheric pressure. This causes the ball units 32 to be activated so that the balls 207 are raised to their upper positions for supporting the article 34, as shown in FIG. 15. This enables the article 34 to be reoriented on the tray 66 or to enable the article to be transferred to another supporting surface. The tray 66 may be supported on a moveable cart, or may be an integral part of the cart. The tray can also be conveyed on a roller conveyor so that, in effect, the tray 66 functions as a travelling work station.

Minor changes may be made in the form and construction of the invention without departing from the materials herewith thereof. It is not, however, desired to confine the invention to the exact form herein shown and described, but it is desired to include all such as properly come within the scope claimed.

The invention having been thus described, what is claimed as new and desired to be secured by Letters Patent is:

What is claimed is:

1. A conveyor comprising:

(a) a pair of spaced elongated horizontal frame members;

(b) a plurality of spaced rollers mounted on said frame member for axial rotation and extending horizontally and transversely of said frame members for supporting an article and for conveying the article transversely of said rollers and longitudinally of said frame members, said article resting on top of said rollers within an article conveyance plane;

(c) at least two spaced interrupter strips supported on said frame members for forming a work station, each of said interrupter strips extending parallel to said rollers and within the space between two adjacent rollers, each of said interrupter strips having a plurality of lifting pads, each of said lifting pads having an upper surface and being selectively movable between a lower position in which said upper surface is below said conveyance plane for enabling the article being conveyed by said rollers to pass over said interrupter strips and an upper position in which said upper surface is above said conveyance plane for supporting said article above said conveyance plane and for frictionally engaging said article and maintaining said article in a stable position above said interrupter strips; and (d) actuating means for selectively moving said lifting elements to said lower and upper positions, and wherein each of said interrupter strips has a plurality of balls mounted for ominidirectional rotation on said interrupter strip, said balls being selectively movable between a lower position in which a ball is below said conveyance plane and an upper position in which at least a portion of the ball is above said conveyance plane, and said actuating means is effective for selectively moving said balls to their lower and upper position independently of said lifting elements so that when said balls are in their upper position and said lifting elements are in their lower position, said article can be supported solely by said balls and moved in any horizontal direction on said balls.

2. A conveyor as recited in claim 1, wherein said work station includes at least two transfer strips supported on said frame members, each of said transfer strips extending parallel to said rollers and located within the space between two adjacent rollers, each of said transfer strips supporting a plurality of balls mounted for omnidirectional rotation on said transfer strip, said balls being selectively movable between a lower position which the balls are below said conveyance plane and an upper position in which at least a portion of the balls are above said conveyance plane, and wherein said actuating means is effective for selectively moving said balls to their lower and upper positions independently of said lifting pads so that when said balls are in their upper position and said lifting pads are in their lower position, said article can be supported solely by said balls and moved in any horizontal direction on said balls.

3. A conveyor as recited in claim 2, wherein said interrupter strips alternate with said transfer strips longitudinally of said frame members.

4. A conveyor as recited in claim 1, wherein said lifting pads are made of an elastomeric material.

5. A conveyor as recited in claim 4, wherein at least some of said pads are impregnated with an electrically conductive material.

6. A conveyor as recited in claim 5, wherein said electrically conductive material is carbon.

7. A conveyor comprising:

(a) a pair of spaced elongated horizontal frame members;

(b) a plurality of spaced rollers mounted on said frame member for axial rotation and extending horizontally and transversely of said frame members for supporting an article and for conveying the article transversely of said rollers and longitudinally of said frame members, said article resting on top of said rollers within an article conveyance plane;

(c) at least two spaced interrupter strips supported on said frame members for forming a work station, each of said interruptor strips extending parallel to said rollers and within the space between two adjacent rollers, each of said interrupter strips having a plurality of lifting pads, each of said lifting pads having an upper surface and being selectively movable between a lower position in which said upper surface is below said conveyance plane for enabling the article being conveyed by said rollers to pass over said interruptor strips and an upper position in which said upper surface is above said conveyance plane for supporting said article above said conveyance plane and for frictionally engaging said article and maintaining said article in a stable position above said interrupter strips; and (d) actuating means for selectively moving said lifting elements to said lower and upper positions, and wherein said work station includes at least two transfer strips supported on said frame members, each of said transfer strips extending parallel to said rollers and located within the space between two adjacent rollers, each of said interruptor strips supporting a plurality of balls mounted for omnidirectional rotation on said transfer strip, said balls being selectively movable between a lower position in which a ball is below said conveyance plane and an upper position in which at least a portion of the ball is above said conveyance plane, and wherein the actuating means is effective for selectively moving said balls to their lower and upper positions independently of said lifting pads so that when said balls are in their upper position and said lifting pads are in their lower position, said article can be supported solely by said balls and moved in any horizontal direction on said balls, and the interruptor strips alternate with the transfer strips longitudinally of said frame members.

* * * * *